(12) United States Patent
Chee (10) Patent No.: US 11,992,130 B2
(45) Date of Patent: May 28, 2024

(54) VEHICLE SEAT ASSEMBLY AND METHOD OF FORMING

(71) Applicant: Lear Corporation, Southfield, MI (US)

(72) Inventor: Martyn Chee, Coventry (GB)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 17/726,861

(22) Filed: Apr. 22, 2022

(65) Prior Publication Data
US 2023/0337828 A1    Oct. 26, 2023

(51) Int. Cl.
*A47C 7/18*  (2006.01)
*A47C 7/24*  (2006.01)
*B60N 2/70*  (2006.01)

(52) U.S. Cl.
CPC ............... *A47C 7/18* (2013.01); *A47C 7/24* (2013.01); *B60N 2/7035* (2013.01); *B60N 2/7041* (2013.01)

(58) Field of Classification Search
CPC .......... A47C 7/18; A47C 7/24; B60N 2/7035; B60N 2/7041
See application file for complete search history.

(56) References Cited

U.S. PATENT DOCUMENTS

| 3,614,159 | A | * | 10/1971 | Christin | A47C 7/18 |
|           |   |   |         |          | 297/452.27 |
| 3,819,232 | A | * | 6/1974 | Wagner | B60N 2/72 |
|           |   |   |         |          | 297/452.21 |
| 4,607,887 | A | * | 8/1986 | Vail | B60N 2/99 |
|           |   |   |         |          | 297/452.57 |
| 4,834,458 | A | * | 5/1989 | Izumida | A47C 7/18 |
|           |   |   |         |          | 297/452.56 |
| 7,703,855 | B1 |  | 4/2010 | Kalinowski | |
| 8,104,840 | B2 | * | 1/2012 | Tarumi | B60N 2/646 |
|           |   |   |         |          | 297/452.48 X |
| 8,979,204 | B2 |  | 3/2015 | Awata et al. | |
| 2004/0084937 | A1 | * | 5/2004 | Berta | B29C 44/0461 |
|           |   |   |         |          | 297/180.14 |
| 2016/0143442 | A1 | * | 5/2016 | Nakada | B64D 11/0647 |
|           |   |   |         |          | 297/452.48 |
| 2018/0079328 | A1 | * | 3/2018 | Ueguri | B60N 2/707 |

FOREIGN PATENT DOCUMENTS

| DE | 102016217957 A1 | 3/2018 | |
| EP | 1895873 B1 | 8/2017 | |
| JP | 2001197970 A | 7/2001 | |
| WO | WO-2018003933 A1 * | 1/2018 | ............. A47C 27/15 |

* cited by examiner

*Primary Examiner* — Rodney B White
(74) *Attorney, Agent, or Firm* — Brooks Kushman P.C.

(57) ABSTRACT

A component for a vehicle seat assembly, a seat assembly, and a method of forming a seat assembly are provided. A unitary foam cushion has a first side, and a second side opposite to the first side to support an occupant. A former extends outwardly from the second side of the foam cushion to a distal end spaced apart from the foam cushion. The former cooperates with the second side of the foam cushion to define an open channel. The open channel is sized to receive a seam of a trim cover assembly. The former defines a first side wall of the open channel, and the second side of the foam cushion defines a second side wall of the open channel. The first side wall defined by the former faces away from the second side of the foam cushion.

20 Claims, 4 Drawing Sheets

VEHICLE SEAT ASSEMBLY AND METHOD OF FORMING

TECHNICAL FIELD

Various embodiments relate to a vehicle seat assembly and a method of assembling.

BACKGROUND

Vehicle seat assemblies may be provided with trim covers formed from multiple panels and positioned over foam cushions. Examples of vehicle seat assemblies may be found in U.S. Pat. Nos. 7,703,855, 8,979,204, and Japanese Pat. Pub. No. JP 2001197970 A.

SUMMARY

In an embodiment, a seat assembly is provided with a frame member, and a foam cushion supported by the frame member. The foam cushion has a first side facing the frame member, and a second side opposite to the first side to support an occupant. A former extends outwardly from the second side of the foam cushion to a distal end region. The former cooperates with a portion of the second side of the foam cushion to define an open channel therebetween. The former defines a first side wall of the open channel, and the second side of the foam cushion defines a second side wall opposite to the first side wall. A trim cover assembly is positioned over the second side of the foam cushion to form a seating surface, the trim cover assembly with a first trim panel connected to a second trim panel via a seam. The first trim panel contacts the distal end region of the former to shape the trim cover. The seam is received within the open channel such that the seam is recessed therein.

In a further embodiment, the first and second side walls of the open channel each extend in a transverse direction of the seat assembly.

In another further embodiment, one of the former and the foam cushion define an end wall for the open channel, with the end wall extending between the first and second side walls of the open channel.

In an even further embodiment, the end wall is transverse to the first and second sides of the foam cushion.

In a further embodiment, a first retention member is connected to one of the first foam cushion and the former, with the first retention member positioned within the open channel. A second retention member is connected to the trim cover assembly adjacent to the seam. The first retention member cooperates with the second retention member to retain the seam within the open channel, and connect the trim cover assembly to the foam cushion.

In another further embodiment, the foam cushion is a unitary body, and the former is formed from plastic.

In a further embodiment, a second foam cushion is positioned between the second side of the first foam cushion and the trim cover assembly. The second foam cushion is in contact with the former such that the former is positioned between the open channel and the second foam cushion.

In an even further embodiment, an outer surface of the second foam cushion is adjacent to the distal end region of the former and defines an acute angle with the former.

In another even further embodiment, the former has a proximal end that is positioned and embedded between the first foam cushion and the second foam cushion.

In another further embodiment, the foam cushion defines an aperture therethrough, with the aperture intersecting the first and second sides of the foam cushion. The former extends from a proximal end region to the distal end region, with former extending through the aperture of the foam cushion with the proximal end region positioned adjacent to the first side of the foam cushion and supported by the frame member, and the distal end region is positioned adjacent to the second side of the foam cushion.

In an even further embodiment, the distal end region of the former has a first face defining a portion of the open channel, and a second face intersecting the first face, the second face in contact with the trim cover.

In a yet even further embodiment, the first face of the former extends towards the second side wall of the open channel towards an entrance to the open channel, such that a width of the open channel narrows in a direction towards the entrance.

In another even further embodiment, the former defines a transverse section connecting the proximal end region to the distal end region. The transverse section of the former defines an end wall of the open channel.

In an even further embodiment, a second former is connected to the frame member. The foam cushion is connected to the frame member. The proximal end region of the first former is connected to the second former.

In another embodiment, a component for a vehicle seat assembly is provided with a unitary foam cushion having a first side, and a second side opposite to the first side to support an occupant. A former extends outwardly from the second side of the foam cushion to a distal end spaced apart from the foam cushion. The former cooperates with a portion of the second side of the foam cushion to define an open channel therebetween, with the open channel sized to receive a seam of a trim cover assembly. The former defines a first side wall of the open channel, and the second side of the foam cushion defines a second side wall opposite to the first side wall. The first side wall defined by the former faces away from the second side of the foam cushion.

In an embodiment, a method of forming a seat assembly is provided. A former is supported relative to a foam cushion such that the former extends outwardly from a first side of the foam cushion to a distal end, to define an open channel. A trim cover assembly is positioned over the foam cushion and the former such that a first trim panel is in contact with and shaped by the distal end of the former. The first trim panel is connected to a second trim panel with a seam within the open channel. A first retention member connected to the seam is attached to a second retention member connected to an end wall of the open channel to fasten the trim cover assembly to the foam cushion.

In a further embodiment, a first tool is translated along a first axis towards a second tool to define a mold cavity. Foam is injected into the mold cavity to form the foam cushion without an undercut surface. The first tool is translated along the first axis away from the second tool to release the foam cushion from the mold cavity.

In another further embodiment, a second foam cushion is connected to the first side of the first foam with a proximal end of the former embedded between the first and second foam cushions. The trim cover assembly is positioned over the second foam cushion such that the first trim panel is in contact with and shaped by the second foam cushion.

In a further embodiment, the former is inserted through an aperture defined by the foam cushion such that a proximal end of the former is positioned adjacent to a second side opposite to the first side of the foam cushion.

In an even further embodiment, the proximal end of the former is connected to a frame member of a vehicle seat assembly.

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
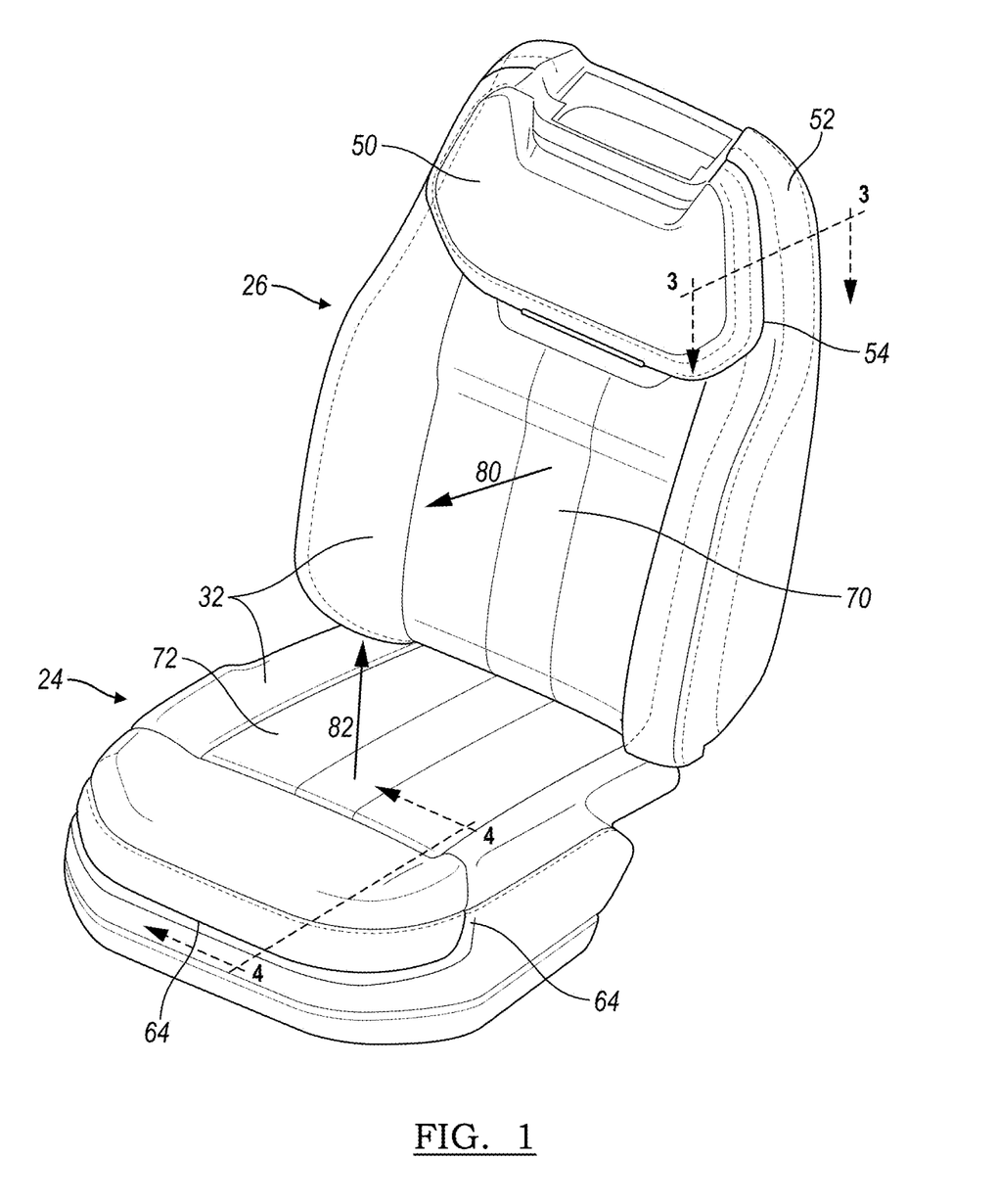
FIG. 1 illustrates a perspective view of a vehicle seat assembly according to an embodiment.
Figure 2:
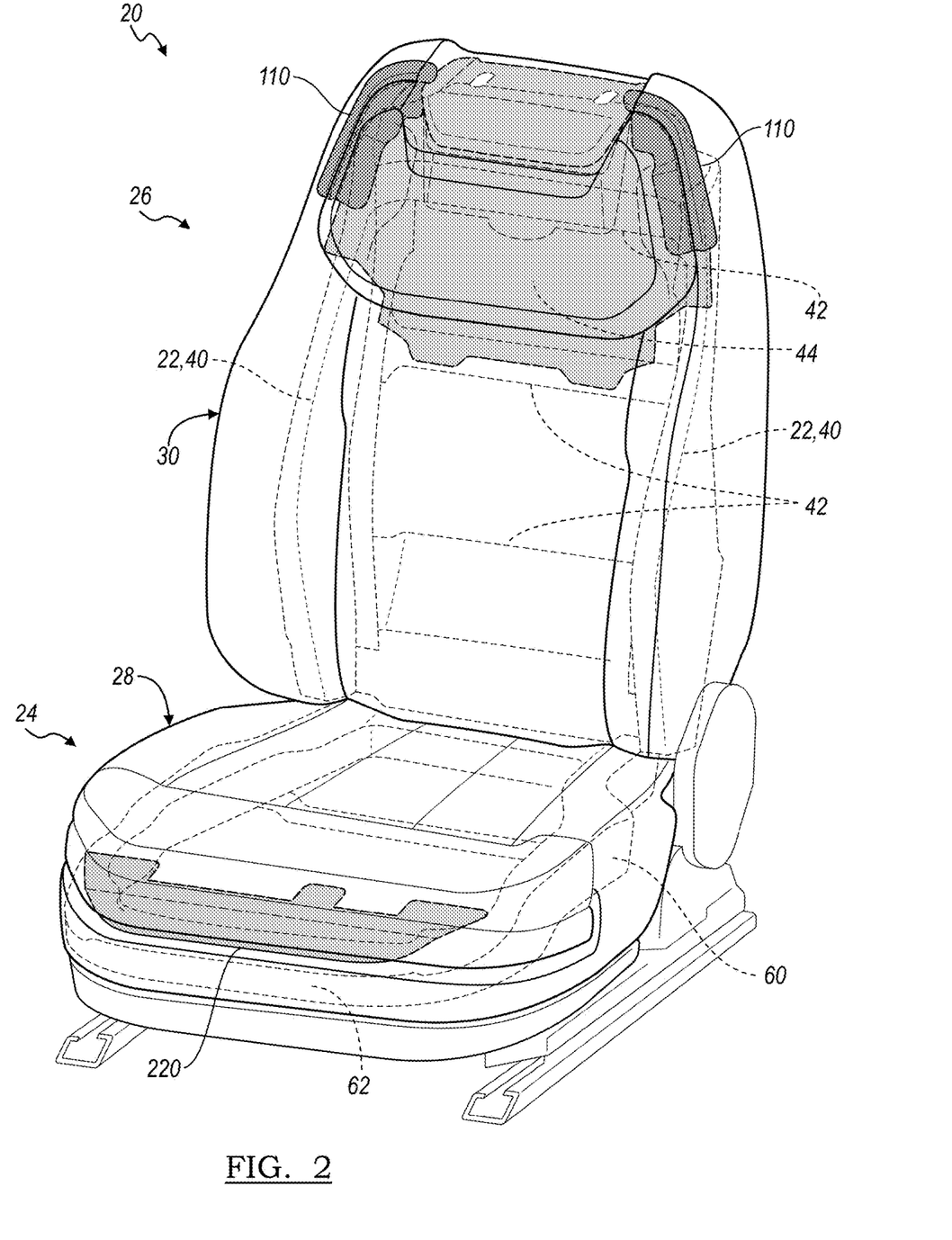
FIG. 2 illustrates a perspective schematic view of the vehicle seat assembly of FIG. 1 without a trim cover assembly.

Referring to FIGS. 1 and 2, a seat assembly 20, such as a vehicle seat assembly 20 is illustrated. FIG. 2 illustrates a schematic view of the seat assembly 20 without a trim cover, and where elements beneath the cushions are shown in broken lines. In various examples, the seat assembly 20 may be shaped and sized as a front row driver or passenger seat, a second, third, or other rear row seat, and may include bench-style seats as shown, bucket seats, or other seat styles. Furthermore, the seat assembly may be a non-stowable seat or a stowable seat that may be foldable and stowable in a cavity in the vehicle floor. Additionally, the seat assembly 20 may be configured for use with other non-vehicle applications.

The seat assembly 20 has a frame 22 or other support structure (shown in broken lines in FIG. 2). The seat assembly has seat components, and these seat components include at least a seat base 24 and a seat back 26. The seat base 24 may be sized to receive a seated occupant to support a pelvis and thighs of the occupant. The seat back 26 may be sized to extend upright from the seat base 24 to support a back of the occupant. The seat assembly may additionally have a head restraint.

The seat base 24 has a seat base cushion 28. The seat back 26 has a seat back cushion 30. The frame 22 may include wire suspension mats or other structure to support the cushions 28, 30. Each cushion 28, 30 may be formed from one or more unitary molded foam elements, such as a molded polyurethane foam.

The frame 22 provides rigid structural support for the seat components, e.g. the seat base 24 and seat back 26, and may be provided as multiple frame members that are moveable relative to one another to provide adjustments for the seat assembly. The frame may be formed from a stamped steel alloy, a fiber reinforced polymer, or any suitable structural material. Additional support elements, or formers, may be connected to the frame 22 as described below.

A trim cover assembly 32 is used to cover the seat base cushion 28 and the seat back cushion 30, and provide a seating surface for the seat assembly 20. In one example, the trim cover 32 covers both of the cushions 28, 30. In other examples, multiple trim covers 32 are provided to cover the seat bottom cushion and the seat back cushion. The trim cover assembly 32 may be formed from one or more trim panels of a fabric, leather, leatherette, vinyl, or other material. Two adjacent trim panels may be sewn or otherwise connected to one another, e.g. via welding or the like, along a seam.

In the example shown, the frame 22 for the seat back 26 includes left and right side members 40 with several cross members 42 that connect the side members 40 to one another. A front former 44 is connected to the front surface or front side of the frame 22 and extends across the frame, and a rear former may also be connected to the rear surface or rear side of the metal frame 22 and extends across the frame. The front former 44 and rear former may each be made from a plastic material. The trim cover assembly 32 is provided over the front of the seat back cushion 30, the metal frame 22, and front former 44, and is connected to the rear former or rear side of seat assembly 20. A rear closeout panel may be attached to the rear former to cover the attachment of the trim cover assembly 32 to the rear former on the back surface of the seat back 26.

The seat back 26 includes a pillow element 50 as shown on a front surface of the seat back 26. The seat back cushion 30 defines a base element 52 and the pillow element 50. A deep groove or channel 54 extends along the sides of the pillow element 50 and between the pillow element 50 and the base element 52. A seam of the trim cover assembly 32 may be positioned and concealed from view within the deep groove or channel 54, e.g. as a deeply recessed seam, as further described below with reference to FIG. 3.

In the example shown, the frame 22 for the seat base 24 includes left and right side members 60 with several cross members 62 that connect the side members to one another, or alternatively, may include an outer frame member providing the perimeter of the seat base 24. The trim cover assembly 32 is provided over the top of the seat base cushion 28 and the metal frame 22, and is connected to the frame 22 or underside of the cushion 28 for the seat base 24. The seat base 24 includes a deep groove or channel 64 that extends along the front and/or side faces of the seat base 24, and a seam of the trim cover assembly 32 may be positioned and concealed from view within the deep groove or channel 64, e.g. as a deeply recessed seam, as described in further detail below with respect to FIG. 4.

Typically, a deeply recessed seam has previously been located on a front face 70 of the seat back 26 or the upper face 72 of the seat base 24 as the position of the recessed seam needs to correspond with a deep channel in the underlying foam cushion 28, 30, and the channel is aligned with the opening direction of the mold used to form the cushion 28, 30, which corresponds to a direction 80 transverse to the front face 70 of the seat back cushion 30 or a direction 82 transverse to the upper face 72 of the seat base cushion 28. It may be undesirable to provide a more complicated high volume mold to provide deep grooves or channels 54, 64 in the foam cushions 28, 30 as undercuts to the upper face 72 or front face 70 as shown and described for the seat assembly 20 in FIGS. 1-2 as additional tool elements and paths/directions are needed providing a more complex tool configuration, and it may be difficult to keep the additional tool features for the undercut coated in mold release agent and free of debris thereby inhibiting releasing the component from the mold.

In the examples shown and described below, the seat assembly formers that provide an undercut surface for the associated foam cushion 28, 30, and cooperate with the foam cushion 28, 30 to define a channel 54, 64 or groove for the seam of the trim cover assembly 32. The undercut surfaces provided by the formers are not aligned in the direction of the opening of the tool or mold, e.g. directions 80, 82, and furthermore may be generally transverse to the direction of opening of the tool or mold. FIG. 2 illustrates formers as described below with respect to FIGS. 3 and 4, which may be at least partially covered by the cushions, with shading for clarity.

Figure 3:
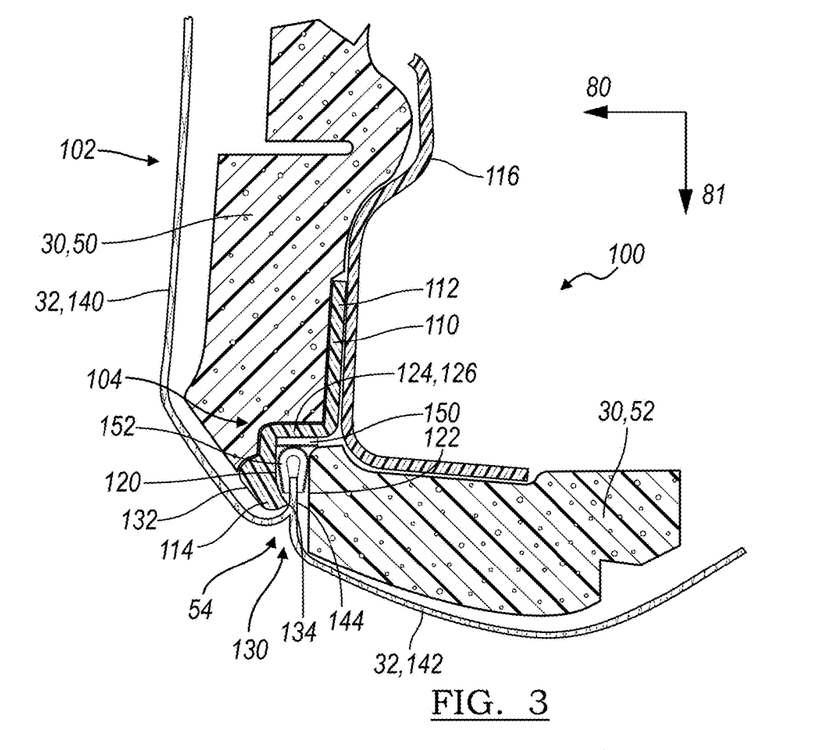
FIG. 3 illustrates a partial sectional view of a seat back of the vehicle seat assembly of FIG. 1.

FIG. 3 illustrates a sectional view of the seat back 26 of the vehicle seat assembly 20 of FIG. 1-2. Elements that are the same as or similar to those described above with respect to FIGS. 1-2 are given the same reference numbers for simplicity.

The seat back 26 has the external appearance of having a separately trimmed pillow element 50 positioned on the trimmed base element 52 of the seat back 26, with a deep groove or channel 54 separating the pillow element from the seat back. In actuality, the base element 52 and pillow element 50 may be formed from a single, unitary foam component or cushion 30, e.g. created in the mold as one component. This simplifies the assembly process for the seat back 26 as a separate trimmed pillow element 50 does not need to be created and then located and attached to the seat back 26 or base element 52. The foam cushion 30 has a first side 100 and a second side 102 opposite to the first side. The first side 100 may generally face or be supported by the frame 22, and may generally be known in the art as a B-side or B-surface. The second side 102 may generally face the seat occupant, or provide a portion of the seating surface for the occupant to support the occupant, and may generally be known in the art as an A-side or A-surface. The foam cushion 30 is supported on or by the frame 22.

In one example, the foam cushion 30 is formed or shaped as an integral component during the injection molding process as described below. In order to simplify the injection molding process and tools, the foam cushion 30 may be formed without any undercuts relative to the first side 100 or second side 102 of the foam cushion. As such, additional elements are required to provide the deep grooves or channels 54, and to also provide a sharp faceted appearance or clean lines for the seat back adjacent to these grooves or channels by shaping or contouring the overlying trim cover assembly in these regions, e.g. around the perimeter edge of the pillow element 50.

The foam cushion 30 defines an aperture or a slot 104 extending through the foam cushion 30 and intersecting the first side 100 and the second side 102 of the foam cushion. The foam cushion 30 may be provided with more than one aperture or slot. In the example shown, the foam cushion 30 has two slots 104, with each slot extending along a respective side of the pillow portion 50 of the foam cushion, and between the pillow portion 50 and the base portion 52. Each slot 104 is associated with a channel 54.

A first former 110 is provided for the seat back. Each slot 104 may be provided with its own associated first former. The first former 110 is supported by the frame 22, and extends through the associated slot 104. The first former 110 may extend along the length of the slot 104. The first former 110 extends from a proximal end region 112 to a distal end region 114.

The proximal end region 112 is connected to or supported by the frame 22 and is adjacent to the first side 102 of the foam cushion. In one example the proximal end region 112 is connected directly to the frame 22. In another example, and as shown, the first former 110 is directly connected to a second former 116, such as the front former, and the front former is directly connected to the frame 22. The first former 110 and the front former 116 may each be formed from a plastic material, such as a thermoplastic material, and furthermore may be provided as acrylonitrile butadiene styrene.

The distal end region 114 of the first former 110 is adjacent to the second side 102 of the foam cushion. The first former 110 extends outwardly from the second side 102 of the foam cushion to the distal end region 114, and cooperates with a portion of the second side 102 of the foam cushion to define an open channel 54 therebetween. The distal end region 114 of the first former may be spaced apart from the foam cushion 30. The distal end region 114 of the first former has a first face 120 that defines a first side wall of the open channel 54. The second side 102 of the foam cushion defines a second side wall 122 opposite to the first side wall.

In one example, and as shown, the first and second side walls 120, 122 of the open channel each extend in a transverse direction 81 of the seat assembly, or a direction generally transverse or perpendicular to direction 80. The first and second side walls 120, 122 may be generally or substantially parallel to the first and second sides 100, 102 of the foam cushion. As used herein, substantially may mean within ten degrees, twenty degrees, or forty degrees of the stated orientation.

The open channel 52 has an end wall 124. The end wall 124 extends between the first and second side walls 120, 122 of the open channel. The open channel 54 may therefore be defined by the three sides: the first and second side walls 120, 122, and the end wall 124. In the example shown, the end wall 124 is transverse to the first and second sides 100, 102 of the foam cushion, and is also substantially perpendicular to the first and second side walls 120, 122 of the open channel.

In the example shown, the first former 110 defines a transverse section 126 connecting the proximal end region to the distal end region. The transverse section 126 is angled relative to the distal end region 114 and the proximal end region 112. The transverse section 126 may be substantially perpendicular to the distal end region 114 and/or the proximal end region 112. The transverse section 126 defines the end wall 124 of the open channel.

An entrance 130 to the open channel 54 is defined between the first and second side walls 120, 122 of the channel. The entrance 130 may be generally opposite to the end wall 124.

In the example shown, the first face 120 of the former 110 extends towards the second side wall 122 of the open channel in a direction towards an entrance 130 to the open channel, such that a width of the open channel 54 narrows in a direction towards the entrance 130. The shape of the first face 120, and narrowing of the width of the channel 54 towards the entrance 130, may help in retaining and concealing the seam of the trim cover assembly 32 within the channel. In other examples, the first face 120 and the second side wall 122 of the open channel may be parallel or substantially parallel to one another.

According to one example, and as shown, the first side wall 120 defined by the distal end region of the first former 110, e.g. via the first face, faces away from the second side 102 of the foam cushion.

The distal end region 114 of the first former 110 also forms a second face 132. The second face 132 intersects the first face 120 along at the distal edge 134. The second face 132 may be angled relative to the first face 120, and in the example shown, is oriented at an acute angle relative to the first face 120. The second face 132 may additionally extend to be flush with the adjacent second side 102 of the foam cushion. The second face 132 may provide a surface over which the first trim panel 140 lies and is in contact with. The second face 132 and distal edge 114 of the first former 110 may provide a shape or contour for the overlying trim cover panel 140. Note that the first face 120 and/or the second face 132 may be planar or may be non-planar, e.g. curved, faceted, or the like.

The distal end region 114 of the first former 110 also provides a hard surface for the trim cover assembly 32 to react against when under tension and installed onto the seat assembly 20, and therefore may provide shaping or contouring to the trim cover assembly 32. In the example shown, the second face 132 and distal edge 134 of the first former 110 provides a facet and clean, sharp edge to define the perimeter of the pillow portion 50. In other examples, the second face 132 may have another shape or contour, such as one or more planar faces or facets, a curved radius, a chamfer, or another planar or convex shape. If the former 110 were not present, the foam cushion along the perimeter of the pillow portion 50 may be compressed or otherwise deformed by the trim cover assembly 20, such that the visual appearance would not be as shown.

A trim cover assembly 32 is provided and positioned over the second side 102 of the foam cushion 30 to form a seating surface. The trim cover assembly 32 has a first trim panel 140 connected to a second trim panel 142 via a seam 144. The first trim panel 140 contacts the distal end region 114 of the former 110 to shape the trim cover 32 and provide the faceted appearance and/or distinct edge for the pillow element 50. The seam 144 is received within the open channel 54 such that the seam is recessed therein. The seam 144 may be recessed sufficiently into the open channel 54 that the seam is not readily visible by an occupant. By recessing the seam 144 within the channel 54, the pillow element 50 and its associated trim has the visual appearance of being a separate component on the seat back from the base element 52 and its associated trim.

A first retention member 150 is positioned within the open channel 54. The first retention member 150 may be connected to the foam cushion 30 and/or the first former 110. In the example shown, the first retention member 150 is connected to the end wall 124 provided by the transverse section 126 of the first former, and is a hook fastener of a hook and loop fastener. The hook fastener may be provided on a tape that is connected to the end wall of the first former, e.g. via an adhesive, and that extends along the length of the slot 104 and first former 110.

The trim cover assembly 32 is provided with a second retention member 152. The second retention member 152 cooperates with the first retention member 150 to retain the seam 144 within the open channel 54, and connect the trim cover assembly 32 to the foam cushion 30. The second retention member 152 may be connected to the trim cover assembly 32 adjacent to the seam 144. In one example, the second retention member 152 is a loop fastener of the hook and look fastener. The loop fastener may be sewn into the seam 144, and in one example, is sewn over the seam 144 as a loop. The loop fastener 152 may extend along the seam for the length of the slot 104 and first former 110.

In other examples, other retention members may be used to connect the seam 144 of the trim cover assembly into the open channel 54 and to the end wall 124. For example, a bead sewn into the seam, hog rings, clips, or other second retention members, may be used to connect to a wire running along the end wall, clips, or other first retention members.

Figure 4:
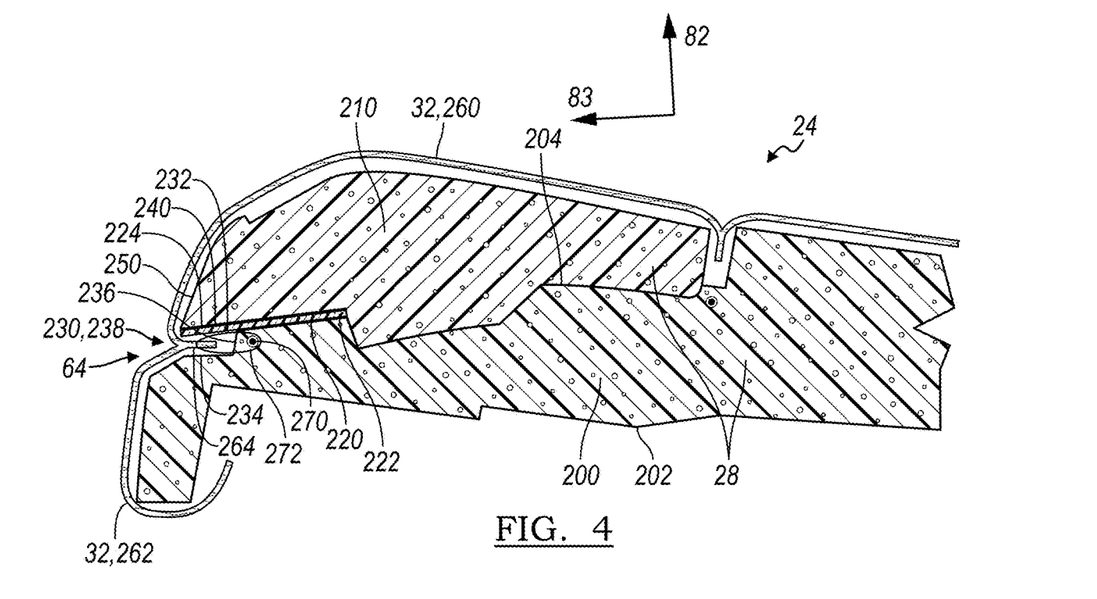
FIG. 4 illustrates a partial sectional view of a seat base of the vehicle seat assembly of FIG. 1.

FIG. 4 illustrates a sectional view of the seat base 24 of the vehicle seat assembly 20 of FIGS. 1-2. Elements that are the same as or similar to those described above with respect to FIGS. 1-2 are given the same reference numbers for simplicity. The seat base 24 has the external appearance with a deep groove or channel 64 along the front and side faces of the seat base. The first foam cushion 200 for the seat base has a first side 202 and a second side 204 opposite to the first side. The first side 202 may generally face or be supported by the frame, and may generally be known in the art as a B-side or B-surface. The second side 204 may generally face the seat occupant, or provide a portion of the seating surface for the occupant to support the occupant, and may generally be known in the art as an A-side or A-surface. The first foam cushion 200 also at least partially defines the front and side faces of the seat base 24. The first foam cushion 200 is supported on or by the frame.

In one example, the first foam cushion 200 is formed or shaped as an integral component during the injection molding process as described below. In order to simplify the injection molding process and tools, the first foam cushion 200 may be formed without any undercuts relative to the first side 202 or second side 204 of the first foam cushion. As such, additional elements are required to provide the deep grooves or channels 64, and to also provide a sharp faceted appearance or clean lines for the seat base 24 adjacent to these grooves or channels 64 by shaping or contouring the overlying trim cover assembly 32 in these regions.

The seat base 24 has a second foam cushion 210 that is connected to or supported by the first foam cushion 200. In one example, the second foam cushion 210 is connected to the first foam cushion 200 via an adhesive. The second foam cushion 210 may likewise be formed as an integral or unitary component, with an A-side and a B-side, and without any undercuts relative to the A- and B-sides. The second foam cushion 210 may form or provide a portion of the seating surface for the occupant, and may additionally at least partially defines the front and side faces of the seat base 24. Locating or alignment features may be formed or molded in the B-side of the second foam cushion 210 and the A-side 204 of the first foam cushion 200 as shown to locate the cushions 200, 210 relative to one another during assembly.

A second former 220 is provided for the seat base 24. The second former 220 may extend along the length of the desired groove or channel 64. The second former 220 extends from a proximal end region 222 to a distal end region 224. The second former 220 may be generally provided with a planar cross-section according to one example and as shown. In other examples, the second former 220 may have another shape or cross-section.

The second former 220 is positioned relative to the first foam cushion 200 such that the proximal end region 222 is supported by the second side 204 of the first foam cushion. In one example the proximal end region 222 may be connected directly to the first foam member 200, e.g. via an adhesive or a fastener. Furthermore, the proximal end region 222 may be positioned between the first and second cushions 200, 210, and may also be connected to the second cushion 210 via an adhesive. The second former 220 may be formed from a plastic material, such as a thermoplastic material, and furthermore may be provided as acrylonitrile butadiene styrene.

The distal end region 224 of the second former 220 is adjacent to the second side 204 of the first foam cushion and spaced apart therefrom. The second former 220 extends outwardly from the second side 204 of the first foam cushion 200 to the distal end region 224, and cooperates with a portion of the second side 204 of the first foam cushion to define an open channel 230 therebetween. The distal end region 224 of the second former 220 may be spaced apart from the first foam cushion 200. The distal end region 224 of the second former 220 has a first face 232 that defines a first side wall of the open channel 230. The second side 204 of the foam cushion 200 defines a second side wall 234 opposite to the first side wall 232.

In one example, and as shown, the first and second side walls 232, 234 of the open channel each extend in a transverse direction 83 of the seat assembly and seat base 24, or a direction generally transverse or perpendicular to direction 82. The first and second side walls 232, 234 may be generally or substantially parallel to the first and second sides 202, 204 of the first foam cushion 200. As used herein, substantially may mean within ten degrees, twenty degrees, or forty degrees of the stated orientation.

The open channel 230 has an end wall 236. The end wall 236 extends between the first and second side walls 232, 234 of the open channel 230. The open channel 230 may therefore be defined by the three sides: the first and second side walls 232, 234, and the end wall 236. In the example shown, the end wall 236 is transverse to the first and second sides 202, 204 of the foam cushion 200, and is also substantially perpendicular to the first and second side walls 232, 234 of the open channel 230. The end wall 236 may be substantially parallel to an opening direction for the mold or tool used to form the first foam member, such as direction 82. In the example shown, the first foam member 200 defines the end wall 236. In another example, the second former 220 may be shaped to define the end wall 236, e.g. with a transverse section or protrusion. An entrance 238 to the open channel 230 is defined between the first and second side walls 232, 234 of the channel. The entrance 238 may be generally opposite to the end wall 236.

In the example shown, the first face 232 of the second former 220 is parallel or substantially parallel to the second side wall 234 of the open channel. In other examples, and as described above with respect to FIG. 3, the first face 232 of the second former may extend towards the foam cushion 200 and second side wall 234 of the channel 230 in a direction towards an entrance 238 to the open channel, such that a width of the open channel 230 narrows in a direction towards the entrance 238 and away from the end wall 236.

According to one example, and as shown, the first side wall 232 defined by the distal end region 224 of the former 220, e.g. via the first face, faces away from the second side 204 of the foam cushion.

The second former 220 also forms a second face 240. The second foam cushion 210 is positioned over the second face 240 of the second former 220 such that the proximal end region 222 of the second former is positioned and embedded between the first foam cushion 200 and the second foam cushion 210. The second foam cushion 210 may therefore be positioned between the second side 204 of the first foam cushion and the trim cover assembly 32. The second foam cushion 210 may be in contact with the former 220 such that the former is positioned between the open channel 230 and the second foam cushion 210. The second foam cushion 210 may extend to be adjacent to or directly adjacent to the distal end region 224 of the second former.

An outer surface 250 of the second cushion 210 adjacent to the distal end region 224 of the second former 220 may be curved or have another profile to provide a shape or contour for the overlying trim cover 32. The outer surface 250 of the second cushion 210 may define an acute angle with the face 232 of the second former 220. Alternatively or additionally, the distal end region 224 of the second former 220 may be provided with a shaped second face as described above for the first former 110 to further define the shape of the trim cover 32 and provide the desired external visual appearance.

The distal edge 224 of the second former may provide an edge, shape or contour for the overlying trim cover panel 260 to wrap around when the seam 264 is inserted into the channel 230. The distal end region 224 and edge of the second former 220 also provides a hard surface for the trim cover assembly 32 to react against when under tension and installed onto the seat assembly 20, and therefore may provide shaping or contouring to the trim cover assembly 32. In the example shown, the distal edge at the end of the distal end region 224 of the second former provides clean, sharp edge to define the edge of the groove or channel 230. If the former 220 were not present, the second foam cushion 210 along the groove or channel 64 may be compressed or otherwise deformed by the trim cover assembly 32, such that the visual appearance would not be as shown.

A trim cover assembly 32 is provided and positioned over the second sides of the first and second foam cushions 200, 210 to form a seating surface. The trim cover assembly 32 has a first trim panel 260 connected to a second trim panel 262 via a seam 264. The first trim panel 260 contacts the second foam cushion 210 and distal edge 224 of the second former 220 to shape the trim cover 32 and provide the distinct edge of the groove 64. The seam 264 is received within the open channel 230 such that the seam is recessed therein. The seam 264 may be recessed sufficiently into the open channel 230 that the seam is not readily visible by an occupant. By recessing the seam 264 within the channel 230, the seam is not apparent and the appearance of a clean groove 64 or channel is provided for the seat base 24.

A first retention member 270 is positioned within or adjacent to the open channel 230. The first retention member 270 may be connected to the foam cushion 200 and/or the former 220. In the example shown, the first retention member 270 is connected to or is adjacent to the end wall 236 provided by the first foam cushion 200 and a is a wire molded into the first foam cushion 200. The first retention member 270 may extend along the length of the channel 230 and second former 220.

The trim cover assembly 32 is provided with one or more second retention members 272. The second retention member 272 cooperates with the first retention member 270 to retain the seam 264 within the open channel 230, and connect the trim cover assembly 32 to the foam cushion 200. The second retention member 272 may be connected to the trim cover assembly 32 adjacent to the seam 264. In one example, the second retention member 272 is a series of hog rings or other clips that connect to the wire 270. The second retention member 272 may further include a tie down or other reinforcement member, such as a nonwoven fabric member, that is sewn into the seam 264.

In other examples, other retention members 270, 272 may be used to connect the seam 264 of the trim cover assembly into the open channel 230 and to the end wall 236. For example, a bead sewn into the seam, clips, a hook or loop fastener, or other second retention members, may be used to connect to clips, a loop or hook fastener or other first retention members.

Figure 5:
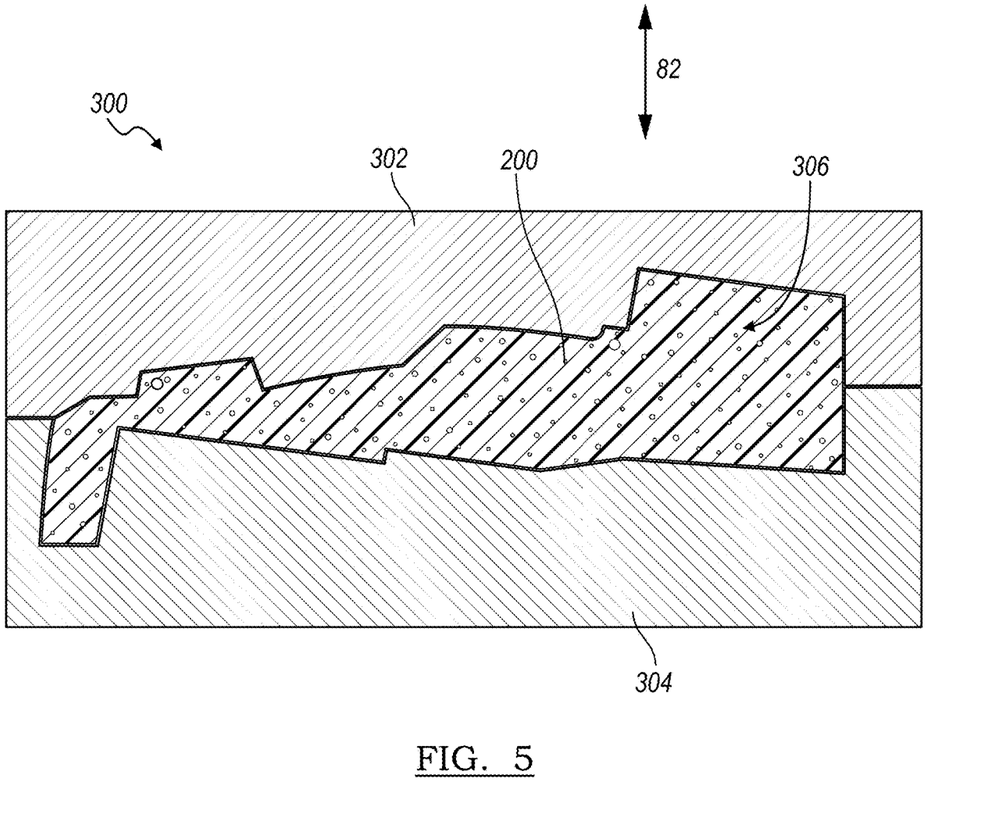
FIG. 5 illustrates a tool for forming a foam cushion according to an embodiment, and for use with a vehicle seat assembly.

FIG. 5 illustrates a mold assembly 300 for forming a foam cushion for use with the seat assembly. The mold assembly 300 is shown for use with the first cushion 200 of the seat base; however, a mold assembly similar that described below may likewise be used to form the seat cushion 30 for the seat back, the cushion 210, or another cushion without an undercut surface for a channel.

The mold assembly 300 has a first tool 302 and a second tool 304. The tools 302, 304 may be provided as die slides such that they assemble and mate with one another to form the tool assembly or mold with surface(s) for forming the foam cushion 200. The first and second tools 302, 304 each form a corresponding molding surface, and the molding surfaces cooperate with one another to define a mold cavity 306 when the tool assembly 300 is in a closed configuration as shown. The mold cavity 306 is shaped to form the first side 202 and a second opposite side 204 of the foam cushion 200. In one example, the first and second tools 302, 304 define the entirety of the mold cavity 306 to form the foam cushion. In other examples, additional tools may be provided with the mold assembly 300.

The first tool 302 translates towards and away from the second tool 304 along a first axis 82, or slide path, e.g. in direction 82 of FIG. 4. The first axis 82 may be transverse or substantially transverse or perpendicular to the first and second sides 202, 204 of the foam cushion 200 as defined by the mold cavity 306 and first and second tools 302, 304.

As shown, the mold cavity 306 defined by the first and second tools 302, 304 would not be able to define an undercut surface for the foam cushion, or the first side 232 of the channel 230, without additional tool elements and paths at an angle to the first axis 82, as there would be interferences caused between any undercut surfaces, such as surface 232, and the slide paths along the first axis 82. In conventional tooling systems, an additional slide or tool would be required to form the undercut surface 232, which adds complexity to the tooling, complications for releasing the component from the mold assembly 300, as well as cost and time for molding each component.

According to various examples, a method of forming a seat assembly 20 or a component for a seat assembly is provided. The method may be used to form the seat back 26 and/or seat base 24 of the seat assembly of FIGS. 1-4 according to various embodiments. The method may have greater or fewer steps than described below. Furthermore, the steps may be performed in another order, or may be performed simultaneously or sequentially.

The foam cushion 30, 200 is formed using a mold assembly 300 as described with respect to FIG. 5. The mold cavity 306 may be sprayed or coated with a mold release material. Additionally, any wires or other elements for use as a retention member 270 may be positioned within the mold cavity to be overmolded with foam and inserted into the first cushion. The first and second tools 302, 304 cooperate to provide a mold cavity 306 that is shaped to define the first and second sides of the associated foam cushion 30, 200 extending transversely to the first axis 80, 82. According to one example, the first tool 302 generally defines the first side of the cushion 30, 200, and the second tool 304 generally defines the second opposite side of the cushion 30, 200.

The first tool 302 is translated towards the second tool 304 along the first axis 80, 82 until the mold cavity 306 is enclosed and defined. The first and second tools 302, 304 may be moved simultaneously towards one another along the first axis, or one after the other. In further examples, only one of the first and second tools 302, 304 is moved along the first axis, and the other remains fixed to a bed of the mold assembly 300.

A material to form the cushion 30, 200 is then injected into the mold 300. In one example, a urethane material is injected into the mold cavity 306 to form a molded urethane cushion. In other examples, other materials may be injected or otherwise provided into the mold cavity 306. The cushion 30, 200 is molded without an undercut surface to the first or second side of the cushion.

The mold assembly 300 is then opened to release the formed cushion 30, 200. The first tool 302 is translated away from the second tool 304 to open the mold cavity 306. As there are no undercut surfaces in the cushion 30, 200, only a single tool path along the first axis 80, 82 is needed. The formed cushion 30, 200 is then removed from the mold cavity and tool assembly.

A former 110, 220 is supported relative to the foam cushion such that the former extends outwardly from the first, seating surface side of the foam cushion to a distal end as described above with respect to FIGS. 3-4. The former 110, 220 is positioned such that the distal end is spaced apart from first side of the foam cushion to define an open channel 54, 230 between the former and the foam cushion. The former 110, 220 defines a first side wall of the open channel, and the first side of the foam cushion 30, 200 defines a second side wall of the open channel opposite to the first side wall. The first side wall of the channel as defined by the former 110, 220 may be an undercut surface to the first side of the cushion.

According to one example, a second foam cushion 210 is formed and provided as described above with respect to FIG. 4. The second foam cushion 210 may also be formed as a molded urethane cushion, and furthermore may be molded without an undercut surface relative to the tooling used to form the second cushion. The second foam cushion 210 is connected to the first side, or seating surface side, of the first foam cushion 200 with the second foam cushion being adjacent to the distal end of the former 220, and with a proximal end of the former embedded between the first and second foam cushions. The former 220 and the second cushion 210 may be connected to the first cushion 200 via an adhesive material, fasteners, or the like.

According to another example, the former 110 is inserted through an aperture 104 defined by the first foam cushion 30 as described above with respect to FIG. 3 such that a proximal end of the former is positioned adjacent to the second side, or frame-side, of the first foam cushion. The proximal end of the former may be connected to a frame member of a vehicle seat assembly, or another former.

A trim cover assembly 32 is positioned over the foam cushion 30, 200 and the former 110, 220 such that a first trim panel 140, 260 is in contact with and shaped by the distal end of the former 110, 220, and a seam 144, 264 connecting the first trim panel to a second trim panel is positioned within the open channel 54, 230. According to one example, the trim cover assembly 32 is also positioned over the second foam cushion 210, if present, such that the first trim panel is in contact with and shaped by the second foam cushion.

A retention member 152, 272 connected to the seam is connected or fastened to a retention member 150, 270 connected to or adjacent to an end wall of the open channel 54, 230 to fasten the trim cover assembly 32 to the first foam cushion 30, 200.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A seat assembly, comprising:
a frame member;
a seat cushion supported by the frame member, wherein the seat cushion having a first side facing the frame member, and a second side opposite to the first side;
a former extending outwardly from the second side of the seat cushion to a distal end region, wherein the former cooperates with a portion of the second side of the seat cushion to define an open channel therebetween, and wherein the former defines a first side wall of the open channel, and the second side of the seat cushion defines a second side wall opposite to the first side wall;
a first retention member;
a second retention member; and
a trim cover assembly positioned over the second side of the seat cushion to form a seating surface, wherein the trim cover assembly includes a first trim panel and a second trim panel, wherein the first trim panel is connected to the second trim panel via a seam, wherein the first trim panel contacts the distal end region of the former to shape the trim cover, and wherein, the first retention member cooperates with the second retention member to retain the seam within the open channel such that the seam is recessed therein.

2. The seat assembly of claim 1, wherein each of the first side wall and the second side wall of the open channel extends in a transverse direction of the seat assembly.

3. The seat assembly of claim 1, wherein one of the former or the seat cushion defines an end wall for the open channel, and wherein the end wall extends between the first and second side walls of the open channel.

4. The seat assembly of claim 3, wherein the end wall is transverse to the first side and the second side of the seat cushion.

5. The seat assembly of claim 1, wherein:
the first retention member is connected to one of the seat cushion or the former, wherein the first retention member is positioned within the open channel,
wherein the second retention member is connected to the trim cover assembly adjacent to the seam, and
wherein the first retention member cooperates with the second retention member for connecting the trim cover assembly to the seat cushion.

6. The seat assembly of claim 5, wherein the first retention member is one of a hook fastener, a loop fastener, a hog ring, a clip, and a bead sewn into the seam, that is configured to be connected to at least a portion of the open channel.

7. The seat assembly of claim 1, wherein the seat cushion is a unitary body, and wherein the former is formed from a plastic.

8. The seat assembly of claim 1, further comprising:
a second seat cushion positioned between the second side of the seat cushion and the trim cover assembly, wherein the second seat cushion is in contact with the former such that the former is positioned between the open channel and the second seat cushion.

9. The seat assembly of claim 8, wherein an outer surface of the second seat cushion is adjacent to the distal end region of the former and defines an acute angle with the former.

10. The seat assembly of claim 8, wherein the former has a proximal end that is positioned and embedded between the seat cushion and the second seat cushion.

11. The seat assembly of claim 1, wherein the seat cushion defines an aperture therethrough, the aperture intersecting the first side and the second side of the seat cushion,
wherein the former extends from a proximal end region to the distal end region, wherein the former further extends through the aperture of the seat cushion with the proximal end region positioned adjacent to the first side of the seat cushion and supported by the frame member, and wherein the distal end region is positioned adjacent to the second side of the seat cushion.

12. The seat assembly of claim 11, wherein the distal end region of the former has a first face defining a portion of the open channel, and a second face intersecting the first face, and wherein the second face is in contact with the trim cover.

13. The seat assembly of claim 12, wherein the first face of the former extends towards the second side wall of the open channel that is towards an entrance to the open channel, such that a width of the open channel narrows in a direction towards the entrance.

14. The seat assembly of claim 11, wherein the former defines a transverse section connecting the proximal end region to the distal end region, and wherein the transverse section of the former defines an end wall of the open channel.

15. The seat assembly of claim 11, further comprising a second former connected to the frame member, wherein the seat cushion is connected to the frame member, and wherein the proximal end region of the former is connected to the second former.

16. A component for a vehicle seat assembly, comprising:
a unitary seat cushion having a first side, and a second side that is opposite to the first side; and
a former extending outwardly from the second side of the seat cushion to a distal end spaced apart from the seat cushion, wherein the former cooperates with a portion of the second side of the seat cushion to define an open channel therebetween, wherein the open channel is sized to receive a seam of a trim cover assembly that includes a first trim panel connected to a second trim panel via the seam, wherein each of a first retention member and a second retention member within the open channel cooperates with each other to retain the seam within the open channel, wherein the former defines a first side wall of the open channel, and the second side of the seat cushion defines a second side wall opposite to the first side wall, and wherein the first side wall defined by the former faces away from the second side of the seat cushion.

17. A seat assembly, comprising:
a former that extends outwardly from a side of a seat cushion to a distal end region of the seat cushion, wherein the former cooperates with a portion of the side of the seat cushion to define an open channel therebetween, and wherein the former defines a first side wall of the open channel, and the side of the seat cushion defines a second side wall opposite to the first side wall; and
a trim cover assembly comprising a first trim panel and a second trim panel that is connected with the first trim panel, via a seam, wherein the seam is configured to be received within the open channel to engage the trim cover assembly with the seat cushion, and wherein each of a first retention member and a second retention member within the open channel cooperates with each other to retain the seam within the open channel.

18. The seat assembly of claim 17, wherein a first face of the former extends towards the second side wall of the open channel that is towards an entrance to the open channel, such that a width of the open channel narrows in a direction towards the entrance.

19. The seat assembly of claim 1, wherein the first trim panel and the second trim panel are either sewn or welded to each other, along the seam.

20. The seat assembly of claim 1, wherein the former provides an undercut surface for the seat cushion and cooperates with the seat cushion for defining the open channel.

* * * * *